(12) United States Patent  
Marotzke et al.

(10) Patent No.: US 7,246,820 B2
(45) Date of Patent: Jul. 24, 2007

(54) AIRBAG

(75) Inventors: Thomas Marotzke, Bergfelde (DE); Sven Ortmann, Fredersdorf (DE); Gerhard Lutter, Bergfelde (DE); Günter Zähle, Berlin (DE); Detlef Crohn, Berlin (DE)

(73) Assignee: Takata-Petri AG (DE)

( * ) Notice: Subject to any disclaimer, the term of this patent is extended or adjusted under 35 U.S.C. 154(b) by 427 days.

(21) Appl. No.: 10/490,806

(22) PCT Filed: Sep. 12, 2002

(86) PCT No.: PCT/DE02/03475

§ 371 (c)(1),
(2), (4) Date: Jul. 19, 2004

(87) PCT Pub. No.: WO03/031237

PCT Pub. Date: Apr. 17, 2003

(65) Prior Publication Data

US 2004/0245751 A1  Dec. 9, 2004

(30) Foreign Application Priority Data

Sep. 27, 2001 (DE) .................................. 101 48 739

(51) Int. Cl.
*B60R 21/23* (2006.01)
(52) U.S. Cl. .................. 280/743.1; 280/731; 280/743.2
(58) Field of Classification Search ................ 280/731, 280/743.1, 743.2, 736, 730.1, 729, 728.2, 280/732, 730.2, 739; 428/225, 107; 139/389
See application file for complete search history.

(56) References Cited

U.S. PATENT DOCUMENTS 5,358,273 A * 10/1994 Onishi et al. ............ 280/743.1
5,362,101 A * 11/1994 Sugiura et al. .......... 280/743.2

(Continued)

FOREIGN PATENT DOCUMENTS

DE       199 51 029 A1     10/1999

(Continued)

OTHER PUBLICATIONS

English translation of an Office Action received for corresponding Japanese Application No. 2003-534238, Sep. 8, 2005 (5 pages).

*Primary Examiner*—Paul N. Dickson
*Assistant Examiner*—Karen J. Amores
(74) *Attorney, Agent, or Firm*—Fitch, Even, Tabin & Flannery

(57) ABSTRACT

An annular airbag is disclosed, of the type where the center piece (12) of the steering wheel cover (11) (mostly embodied as the emblem of the vehicle producer) remains in place during the unfolding process. In order to prevent a vehicle occupant impacting the hole arising above the center piece with an inflated airbag, the tubular region (17) of the airbag above the center piece is embodied such that the cross-sectional area thereof in the inflated state reduces in the direction of the upper plate of the airbag from the center piece (12). The above is achieved, for example, by means of a special forming of the tubular region, by provision of pockets (21) and/or folds (31), the use of special materials, a special fixing of the airbag to the airbag module (9), or the fitting of tension straps (50).

14 Claims, 16 Drawing Sheets

U.S. PATENT DOCUMENTS

| | | | | |
|---|---|---|---|---|
| 5,669,632 | A * | 9/1997 | Johnson et al. | 280/743.2 |
| 5,683,109 | A * | 11/1997 | Birman | 280/743.2 |
| 6,042,147 | A * | 3/2000 | Nishijima et al. | 280/743.1 |
| 6,059,312 | A * | 5/2000 | Staub et al. | 280/729 |
| 6,074,722 | A * | 6/2000 | Cuccias | 428/107 |
| 6,254,121 | B1 * | 7/2001 | Fowler et al. | 280/729 |
| 6,290,257 | B1 * | 9/2001 | Bunce et al. | 280/739 |
| 6,299,203 | B1 * | 10/2001 | Muller | 280/736 |
| 6,431,599 | B1 * | 8/2002 | Bohn | 280/743.1 |
| 6,517,100 | B2 * | 2/2003 | Frisch | 280/728.2 |
| 6,536,801 | B2 * | 3/2003 | Frisch | 280/743.1 |
| 6,540,254 | B2 * | 4/2003 | Bieber et al. | 280/732 |
| 6,554,317 | B2 * | 4/2003 | Lorenz et al. | 280/743.1 |
| 6,572,144 | B2 * | 6/2003 | Igawa | 280/743.1 |
| 6,588,798 | B2 * | 7/2003 | Bohn et al. | 280/743.1 |
| 6,595,549 | B2 * | 7/2003 | Bohn et al. | 280/743.1 |
| 6,655,714 | B2 * | 12/2003 | Fellhauer et al. | 280/743.1 |
| 6,726,245 | B2 * | 4/2004 | Fellhauer et al. | 280/743.2 |
| 6,733,037 | B1 * | 5/2004 | Keshavaraj | 280/743.2 |
| 6,802,534 | B2 * | 10/2004 | Neupert | 280/743.1 |
| 6,929,285 | B2 * | 8/2005 | Yamada et al. | 280/743.2 |
| 6,962,363 | B2 * | 11/2005 | Wang et al. | 280/729 |
| 6,991,255 | B2 * | 1/2006 | Henderson et al. | 280/730.2 |
| 7,000,943 | B2 * | 2/2006 | Hasebe et al. | 280/729 |
| 7,093,853 | B2 * | 8/2006 | Hasebe et al. | 280/743.1 |
| 7,108,282 | B2 * | 9/2006 | Hasebe et al. | 280/743.1 |
| 7,121,584 | B2 * | 10/2006 | Hasebe et al. | 280/743.2 |
| 2001/0042978 | A1 * | 11/2001 | Frisch | 280/736 |
| 2001/0042979 | A1 * | 11/2001 | Frisch | 280/743.1 |
| 2001/0052691 | A1 * | 12/2001 | Bieber et al. | 280/730.1 |
| 2002/0084638 | A1 * | 7/2002 | Neupert | 280/743.1 |
| 2002/0105171 | A1 | 8/2002 | Fellhauer et al. | |
| 2003/0034637 | A1 * | 2/2003 | Wang et al. | 280/729 |
| 2003/0218325 | A1 * | 11/2003 | Hasebe et al. | 280/743.2 |
| 2004/0245751 | A1 * | 12/2004 | Marotzke et al. | 280/731 |
| 2006/0192371 | A1 * | 8/2006 | Abe | 280/739 |
| 2006/0197320 | A1 * | 9/2006 | Abe | 280/729 |

FOREIGN PATENT DOCUMENTS

| | | |
|---|---|---|
| DE | 200 10 726 U1 | 6/2000 |
| DE | 200 12 077 U1 | 7/2000 |
| DE | 100 65 461 A1 | 12/2000 |
| DE | 100 65 463 A1 | 12/2000 |
| DE | 100 65 465 A1 | 12/2000 |
| DE | 200 21 533 U1 | 12/2000 |
| DE | 201 02 107 U1 | 2/2001 |
| DE | 201 02 115 U1 | 2/2001 |
| DE | 201 02 107 | 7/2001 |
| DE | 200 10 726 | 10/2002 |
| EP | 1 155 925 A2 | 11/2001 |
| JP | 08268213 | 10/1996 |
| JP | 2000-153742 | 6/2000 |

* cited by examiner

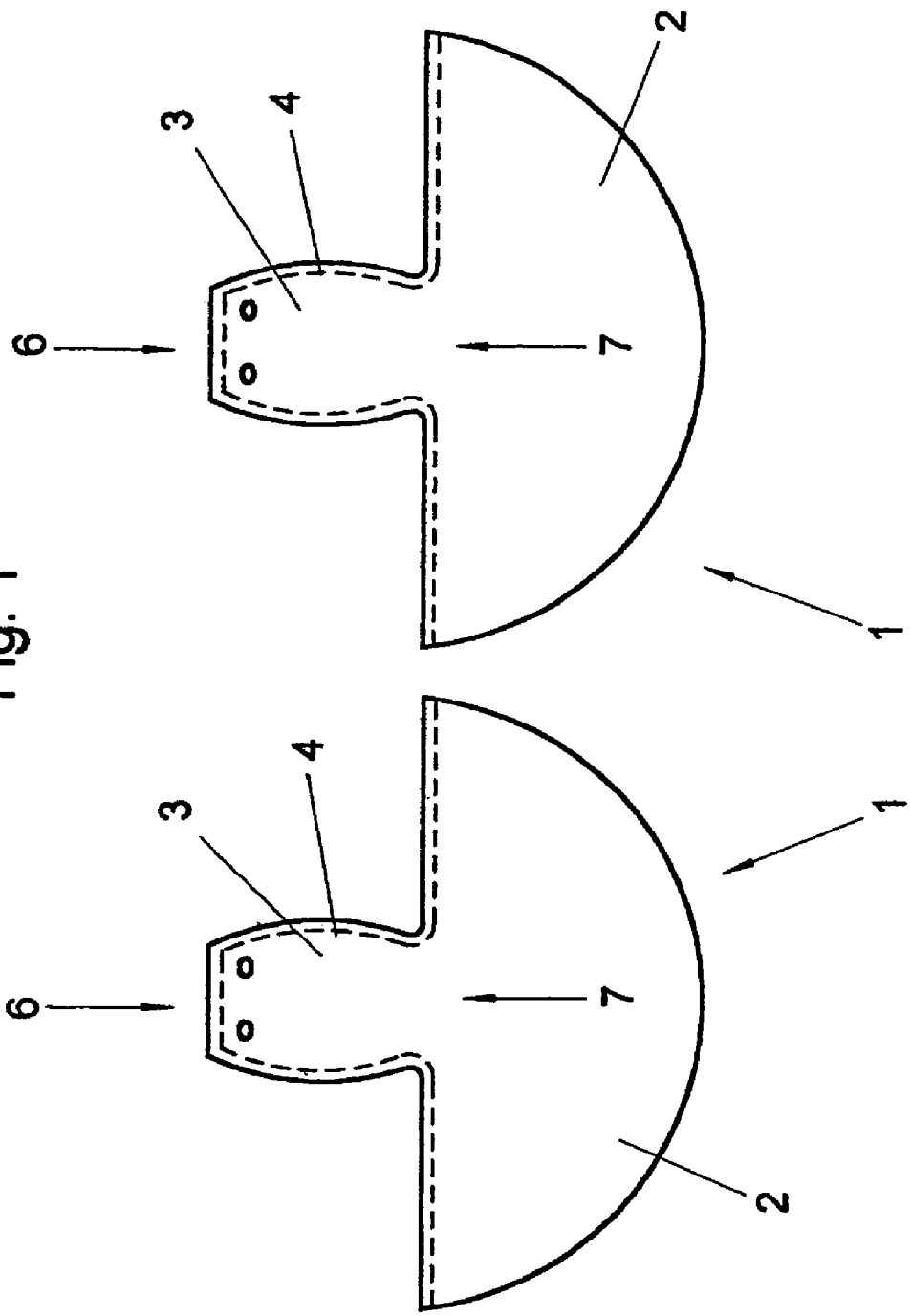

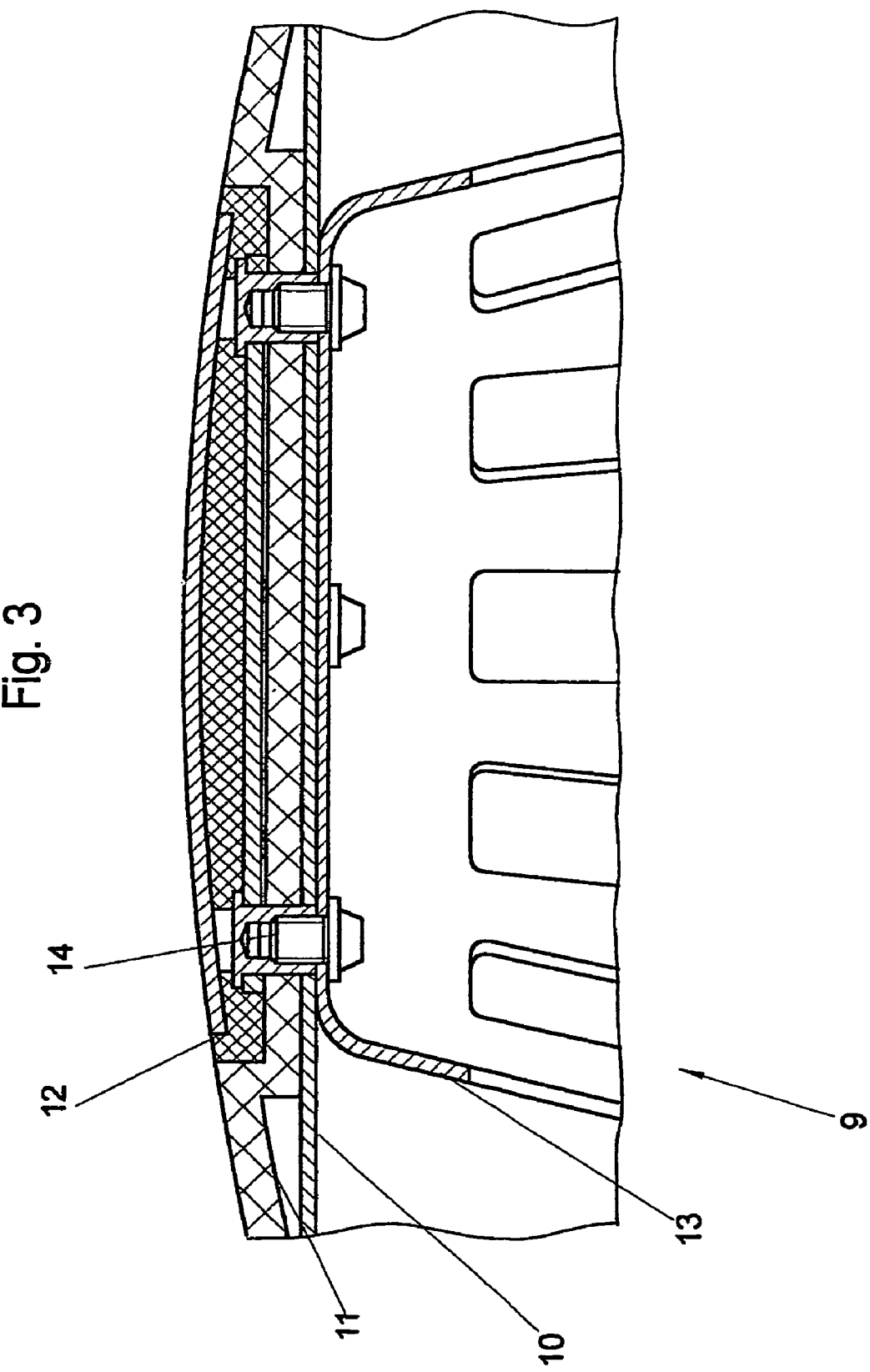

AIRBAG

A "ring airbag" is the airbag of a vehicle airbag module in which the center part of the cover of the steering wheel (usually formed by the emblem of the vehicle manufacturer) remains in position during the entire deployment process. The steering wheel cover opens only in the lateral cap region, in order to allow the airbag to emerge.

However, since the center region does not open, a "hole" occurs in the middle of the inflated airbag. The problem, in this case, is that the head of a vehicle occupant may, under certain circumstances, penetrate into this hole and impinge onto the center part, so that sufficient protection is no longer ensured.

The object of the present invention is at least to mitigate this problem. This object is achieved by means of the invention specified in the independent claim. Advantageous refinements may be gathered from the subclaims.

According to the invention, an airbag for a vehicle is provided, to be arranged in a steering wheel of the vehicle under a cover, in such a way that, during a deployment of the airbag, a center part of the cover remains in position, with an upper plate and a lower plate connected to the latter, and with a tubular region, to be arranged above the center region, for connecting the upper plate to an airbag module in the region of the center part, in the inflated state of the airbag the cross-sectional area of the tubular region decreasing from the center part in the direction of the upper plate.

A narrowing of the tube in the direction of the vehicle occupant prevents the latter, in the event of an accident, from impinging, through the orifice formed by the cross section of the tube, onto the center part (emblem) of the steering wheel.

Preferably, in the wall of the tubular region one or more inflatable pockets are provided, which, in the inflated state, reduce the cross-sectional area of the tubular region.

In another refinement, in the wall of the tubular region one or more folds are provided, which, in the inflated state of the airbag, form pockets which reduce the cross-sectional area of the tubular region.

Furthermore, the cross-sectional area of the tubular region on the upper plate may be star-shaped. The star-shaped region makes it possible for the upper plate simply to "brush over" the steering wheel emblem during the mounting of the airbag. On the other hand, in the inflated state of the airbag, on the surface of the upper plate there is only a slot-like star-shaped "open" cross-sectional area, instead of a cylindrical hole, as in conventional ring airbags.

Moreover, the upper plate may be mounted on the airbag module so as to be rotated with respect to the tubular region. As a result, during the inflation of the airbag, the tubular region is "tied off" and its cross-sectional area reduced.

In a further refinement, the tubular region consists of a fabric which, during the inflation of the airbag, contracts in one direction in such a way that the cross-sectional area of the tubular region is reduced. Such fabrics, which, in the event of expansion in one direction, contract in another direction, are known per se. In use for a tubular region, this means that, during the inflation of the airbag, the tubular region expands in the direction of the vehicle interior and simultaneously contracts transversely thereto. A cross-sectional area of the tubular region is consequently reduced.

In a further refinement, the airbag has a tension band which is fastened at one end to the airbag module and at the other end to the upper plate and which runs around the tubular region, for tying off the tubular region during an inflation of the airbag.

In this refinement, therefore, the narrowing of the tubular region takes place by means of an additional tension band, instead of by virtue of a special shaping of the tubular region of the inflated airbag or of the provision of pockets/folds. The advantage of this refinement is that only minor structural adaptations are required, as compared with conventional ring airbags.

Moreover, according to the invention, an airbag for a vehicle is provided, to be arranged in a steering wheel of the vehicle under a cover, in such a way that, during a deployment of the airbag, a center part of the cover remains in position, with an upper plate having two halves which are essentially symmetrical to one another and which each have a part essentially in the form of a circular cutout and a tongue running in the direction of the height of the circular cutout, the two halves being connected to one another along the chords of the circular cutouts, except in the region of the starts of the tongues, and also along the sides of the tongues, and the upper plate being fastened to an airbag module, below the center part, in the region of those ends of the tongues which point away from the circular cutouts.

Such an upper plate allows the simple production of a ring airbag, of which the tubular region formed by the tongues does not have a cylindrical, but a slot-shaped cross section on that surface of the upper plate which faces the vehicle occupant. The result of this is that the inflated airbag does not have a "hole" between that surface of the upper plate which faces the vehicle occupant and the center part of the steering wheel cover.

A particularly simple connection of the halves is to be produced by means of stitching. However, the upper plate may also be manufactured by means of a one-piece fabric part which, after the required area is produced, is stitched together in particular regions. This is explained in more detail later with reference to the figures.

In one refinement, the tongues each have a barrel-shaped surface. In the inflated state of the airbag, this has the effect that the cross-sectional area of the tube between the surface of the upper plate and the steering wheel emblem is greatly reduced or the tube is closed completely.

In a further refinement, the tongues each have at least one fold. There is therefore additional inflatable fabric in the region of the tube. During a deployment of the airbag, the fabric additionally present due to the folds closes the tube.

In a further refinement, in the inflated state of the airbag, the tongues have pockets extending between the tongues. The pockets likewise form additional inflatable fabric, by means of which the cross-sectional area of the tube is reduced in the region of the pockets.

In a further refinement, the tongues are attached to the airbag module so as to be rotated in relation to the parts having the form of a circular cutout. Due to this rotated attachment, the tube formed by the tongues in the inflated state of the airbag is "tied off", so that a vehicle occupant is protected against impact on the steering wheel emblem.

In a further refinement, the tongues consist of a fabric which, in the event of an expansion of the tongues in the direction of their longitudinal axis, contracts transversely thereto. As already mentioned, such fabrics are known per se. In a ring airbag, then, this fabric can advantageously be used for said tongues, so as to bring about a narrowing of the tube formed by the tongues during the inflation of the airbag, without additional structural measures having to be taken.

Exemplary embodiments of the invention will now be explained with reference to the figures, of which:

FIG. 1 shows diagrammatically the two halves of an upper plate for a ring airbag according to a first exemplary embodiment of the invention;

FIG. 3 shows diagrammatically a cross section of an airbag module with an airbag according to the first exemplary embodiment;

Figure 2A:
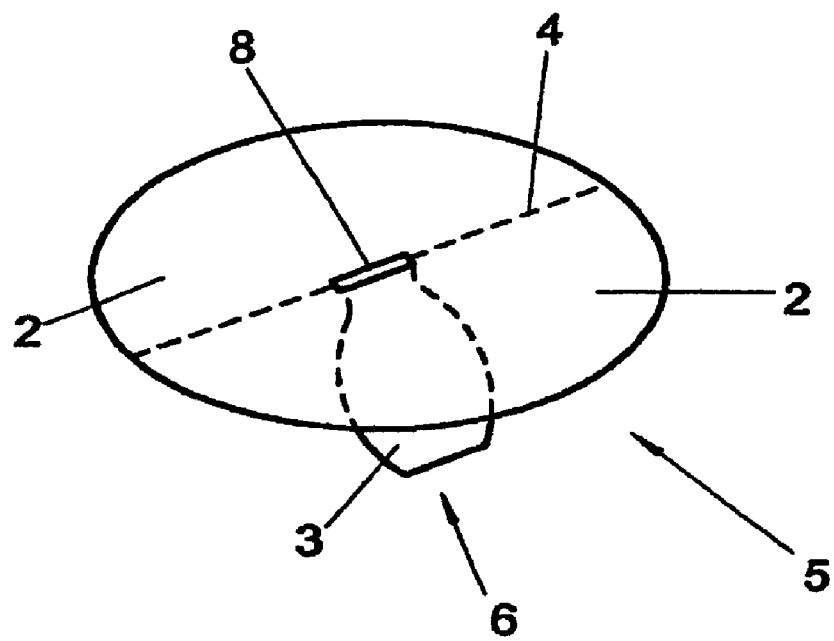
FIGS. 2A and 2B shows diagrammatically two different perspective views of an upper plate of an airbag according to the first exemplary embodiment.

FIG. 1 shows diagrammatically two halves 1 of an (non-folded) upper plate for a ring airbag according to a first exemplary embodiment of the invention. The halves 1 each comprise a semicircular region 2 and a barrel-shaped tongue 3 extending away from this region. The two halves 1 are connected to one another along a seam 4. FIG. 2 shows diagrammatically an upper plate 5 formed by the halves 1 being stitched together. Furthermore, the halves 1 have in each case holes 6, by means of which the upper plate can be fastened to the diffuser of an airbag module.

Figure 2B:
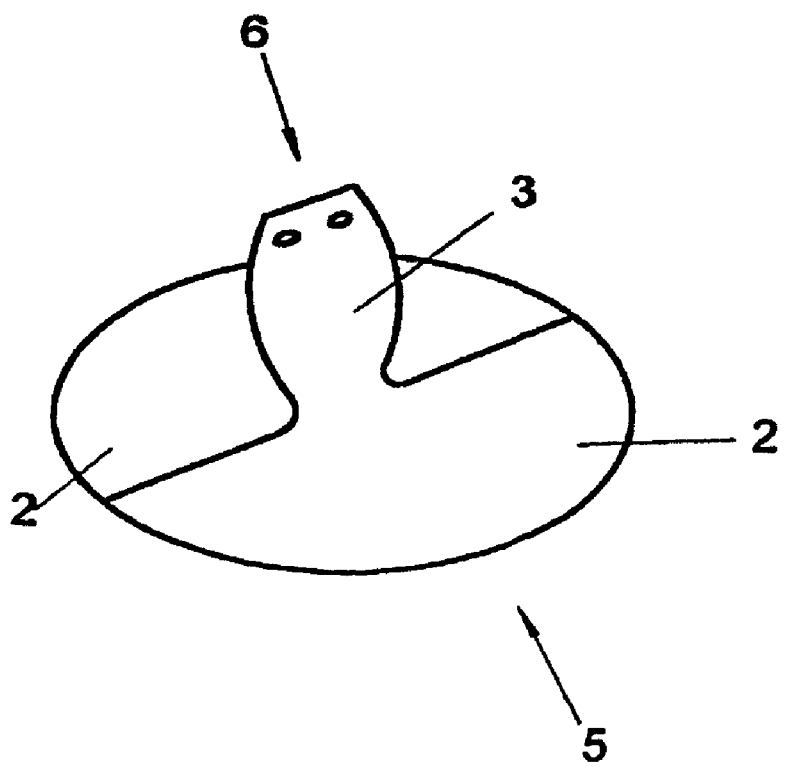

FIGS. 2A and 2B show the upper plate 5 from two perspective views. The upper plate is to be fastened to the diffuser of the airbag module by means of the end of the tongues 3 which is designated by 6.

In a region 7 at the start of the tongues 3, the halves 1 of the upper plate 5 are not connected to one another. The upper plate 5 thereby has a slot 8 on the surface facing a vehicle occupant. This slot 8 is dimensioned such that a center part (vehicle emblem) positioned firmly in the steering wheel plate can be led through this slot. In other words, the circumference of the slot is larger than the circumference of the emblem.

This is necessary because the airbag in the folded state is mounted underneath the steering wheel cover, but, when triggered, has to be deployed around the vehicle emblem. That is to say, during the inflation of the airbag, the vehicle emblem moves through the slot 8 in relation to the upper plate.

FIG. 3 shows diagrammatically a cross section of an airbag module 9 with an airbag 10 according to the first exemplary embodiment in the folded-together state under a cover 11 of a steering wheel. Also illustrated are a firmly mounted emblem 12, a diffuser 13 and a fastening 14 of the airbag 10, of the cover 11, of the emblem 12 and of the diffuser 13 to one another.

Figure 4:
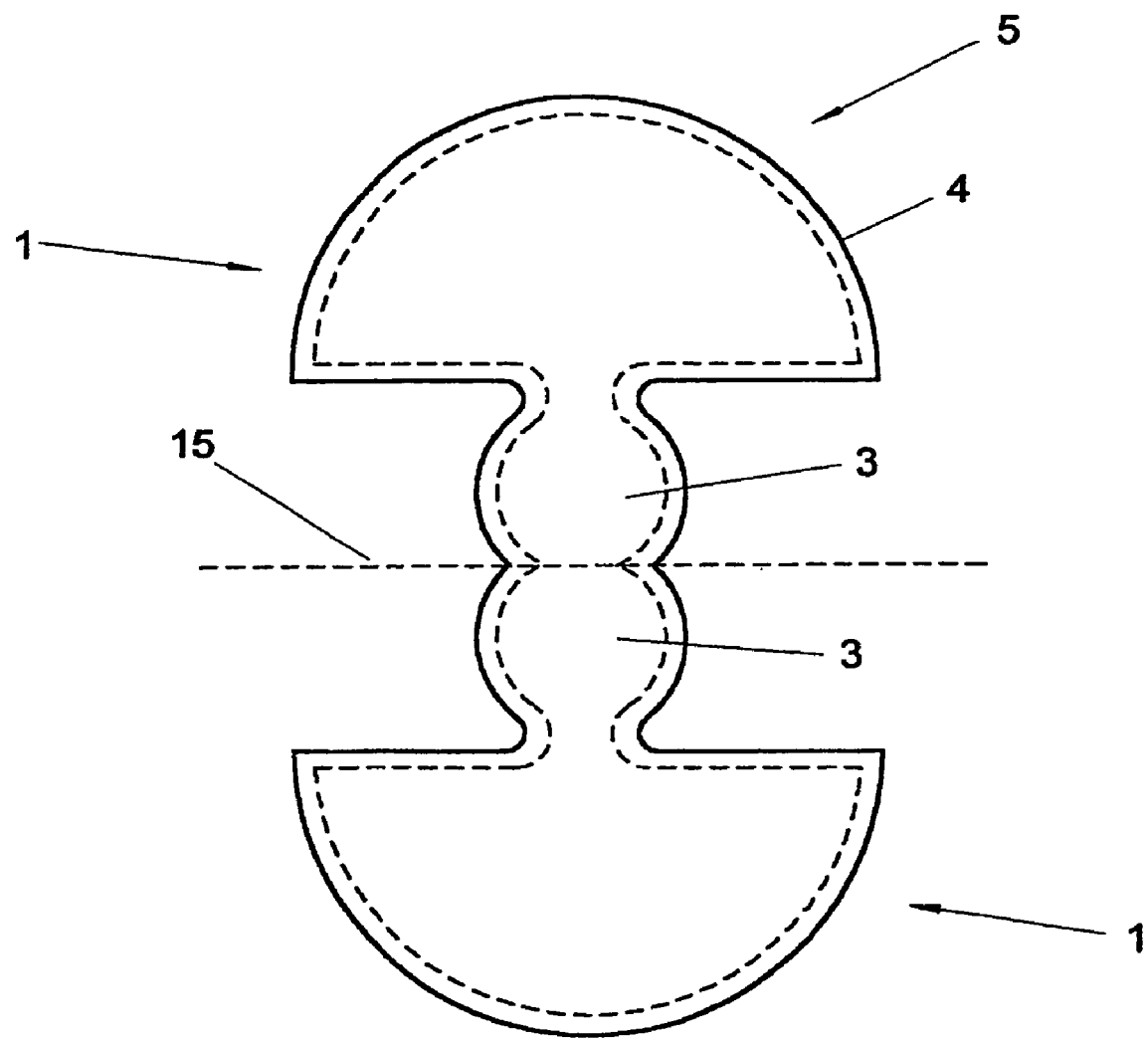
FIG. 4 shows diagrammatically an alternative refinement of the two halves of an upper plate for a ring airbag according to the first exemplary embodiment.

FIG. 4 shows an alternative refinement of the halves 1 for producing the upper plate 5. In this refinement, the halves are manufactured in one piece from a fabric part. That is to say, the tongues 3 and consequently the two halves 1 are already connected to one another from the outset, in contrast to the first refinement. To produce the upper plate, the halves 1 are folded toward one another along a folding line 15 and subsequently stitched to one another along the seam 4. The resulting upper plate corresponds to that from FIG. 2.

Figure 5:
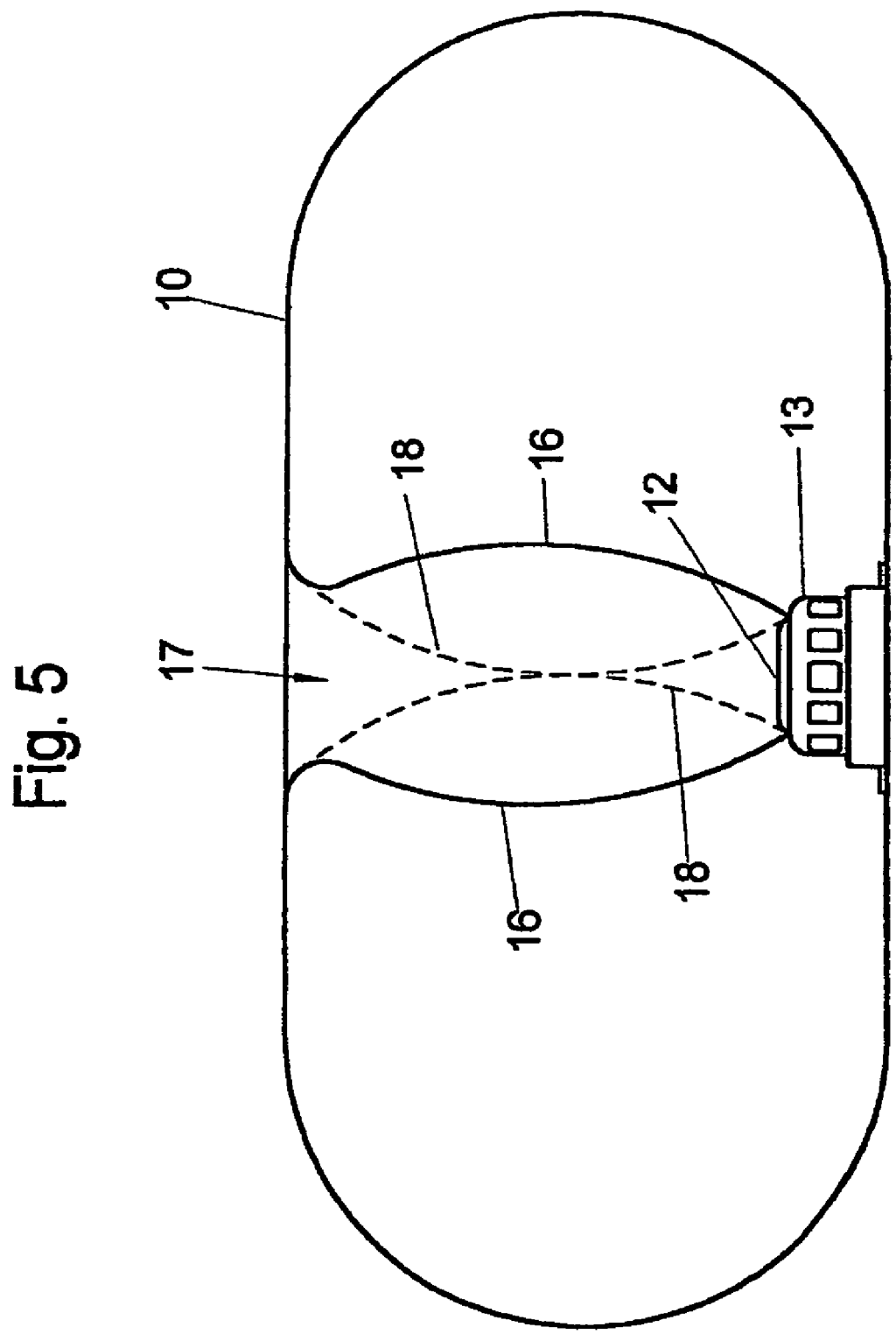
FIG. 5 shows diagrammatically a cross section of an airbag according to the first exemplary embodiment in the deployed/inflated state.

FIG. 5 shows an airbag 10 according to the first exemplary embodiment in the deployed state. The unbroken lines 16 show the run of the airbag outer wall in the tubular region 17 above the emblem 12 in the deployed, but not fully inflated state of the airbag 10. The broken line 18 shows the run of the airbag outer wall in the fully inflated state. It is thereby made clear how the tubular region 17 is closed, as compared with conventional ring airbags, that is to say how the cross-sectional area of the tubular region decreases from the emblem 12 upward in the orientation according to the figure.

Figure 6:
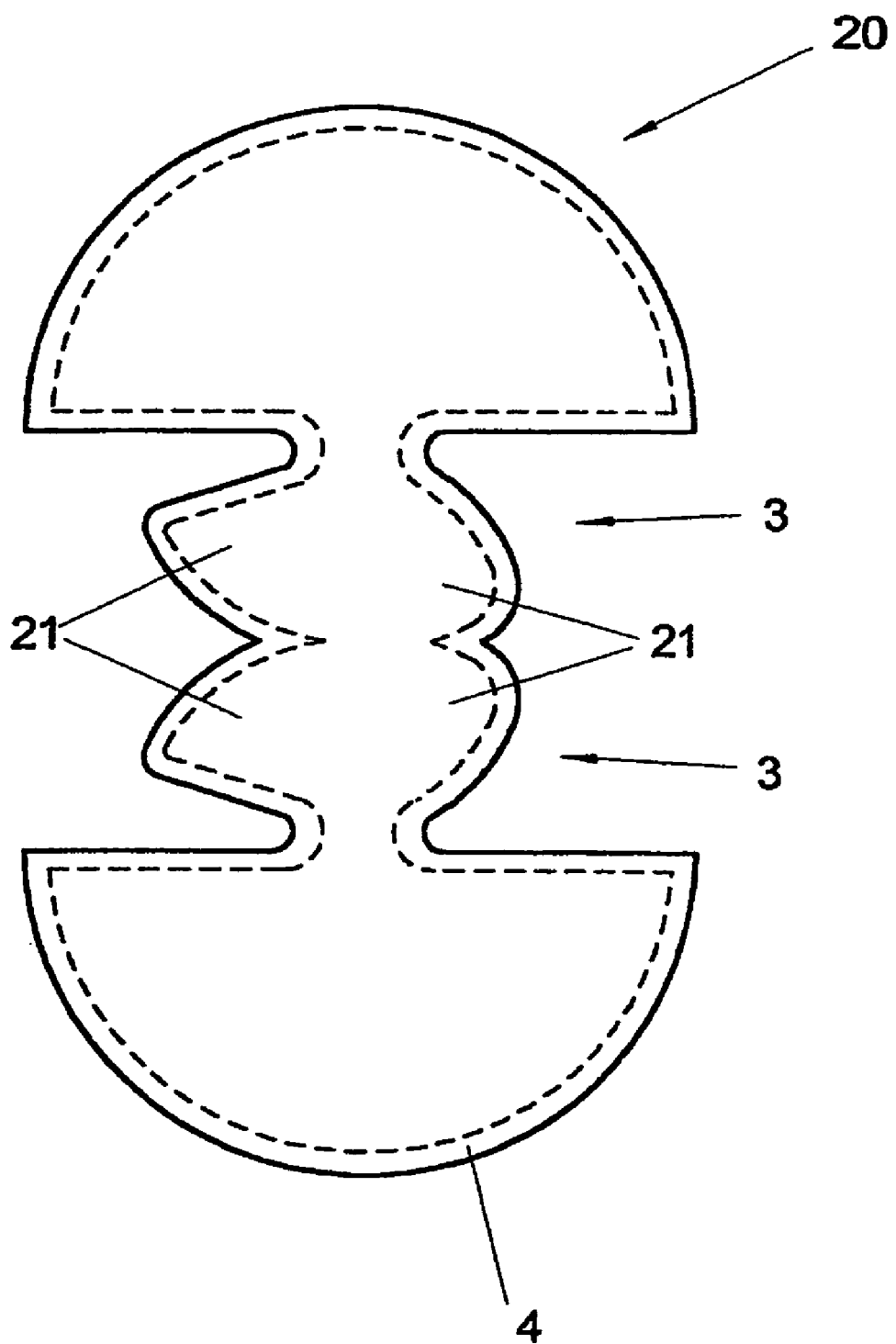
FIG. 6 shows diagrammatically a fabric part for producing an upper plate of an airbag according to a second exemplary embodiment of the invention.
Figure 7:
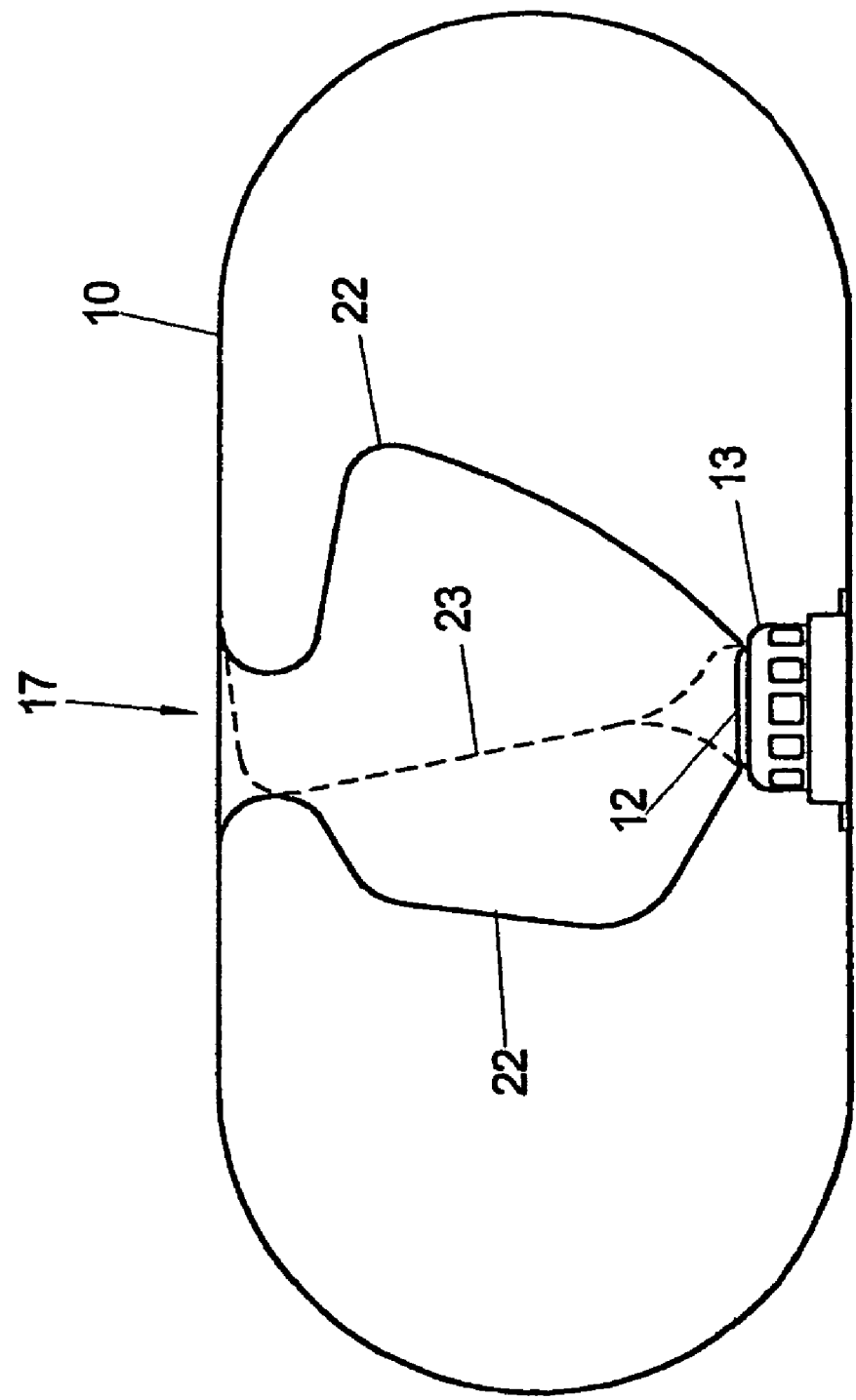
FIG. 7 shows diagrammatically a cross section of an airbag according to the second exemplary embodiment in the deployed/inflated state.

FIG. 6 shows diagrammatically a fabric part 20 for producing an upper plate of an airbag according to a second exemplary embodiment of the invention. The fabric part 20 differs from that of the first exemplary embodiment in that the tongues 3 have pockets 21. These pockets are formed by additional fabric in the region of the tongues 3. During an inflation of the airbag, the pockets 21 are filled with air and close the tubular region 17. This is shown diagrammatically in FIG. 7. The airbag is again shown in the deployed state (pockets not yet inflated, lines 22) and in the fully inflated state with the region 17 closed by the pockets 21 (line 23).

Figure 8:
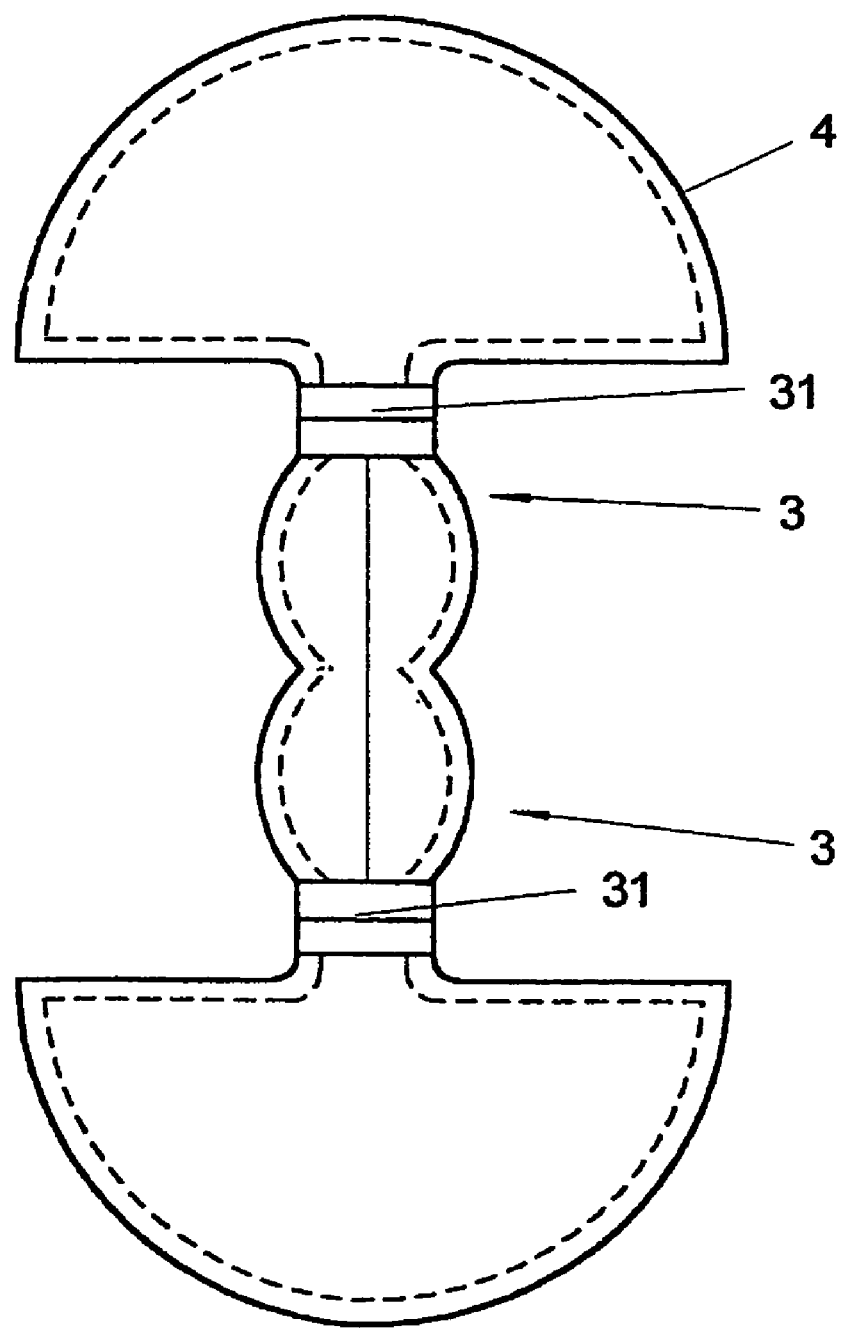
FIG. 8 shows diagrammatically a fabric part for producing an upper plate of an airbag according to a third exemplary embodiment of the invention.
Figure 9:
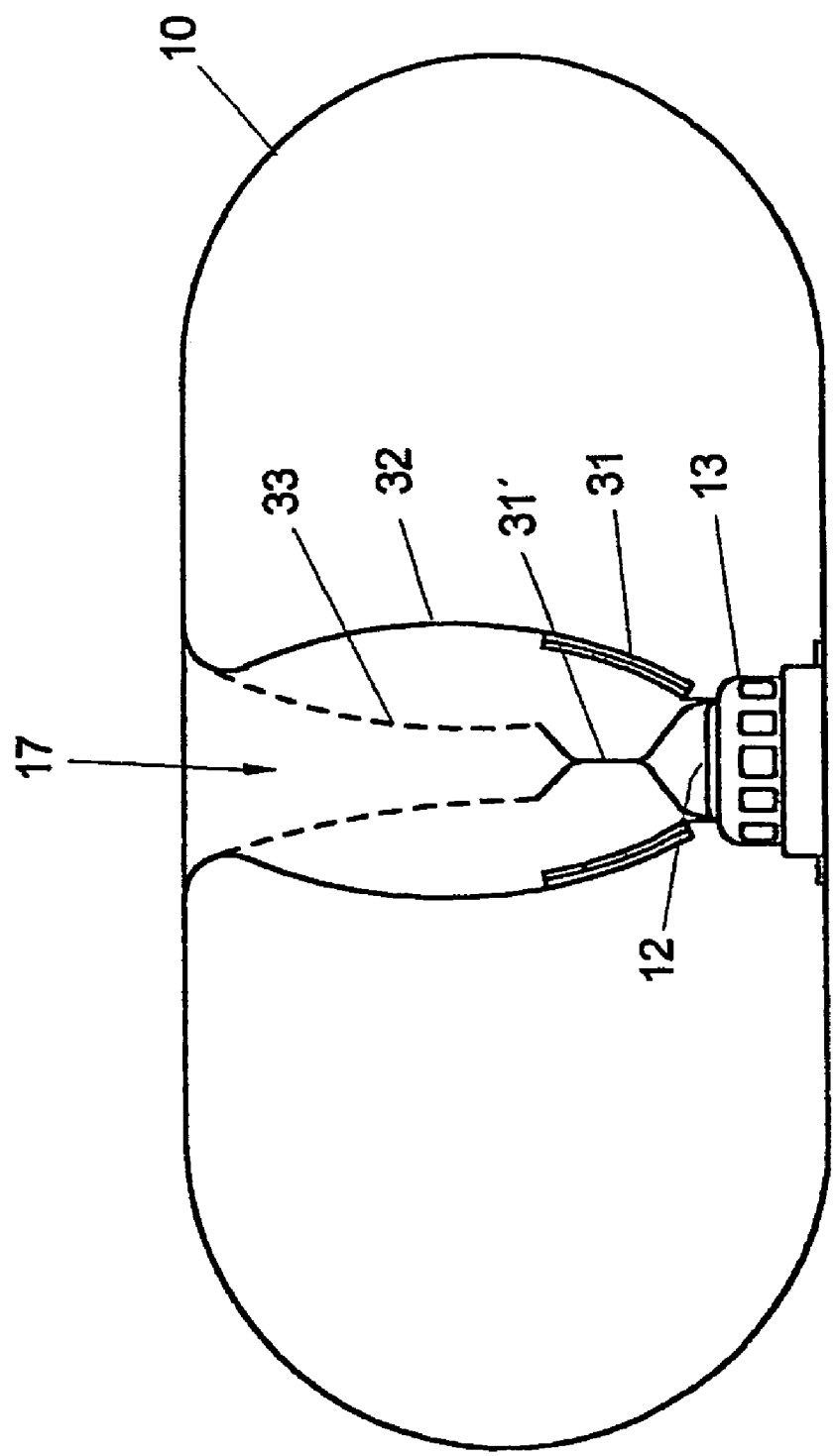
FIG. 9 shows diagrammatically a cross section of an airbag according to the third exemplary embodiment in the deployed/inflated state.

FIG. 8 shows diagrammatically a fabric part 30 for producing an upper plate of an airbag according to a third exemplary embodiment of the invention. The fabric part 30 differs from that of the first exemplary embodiment in that the tongues 3 have a plurality of folds 31. In a similar way to the second exemplary embodiment, the folds provide additional fabric which closes the tubular region 17 during the inflation of the airbag 10. This is shown diagrammatically in FIG. 9. In the inflated state of the airbag 10, the folds 31 become air-filled pockets 31' which have the effect that the cross-sectional area of the tubular region 17 above the emblem 12 is reduced.

FIG. 9 shows the airbag 10 again in the deployed and in the inflated state (lines 32 and 33).

Figure 10:
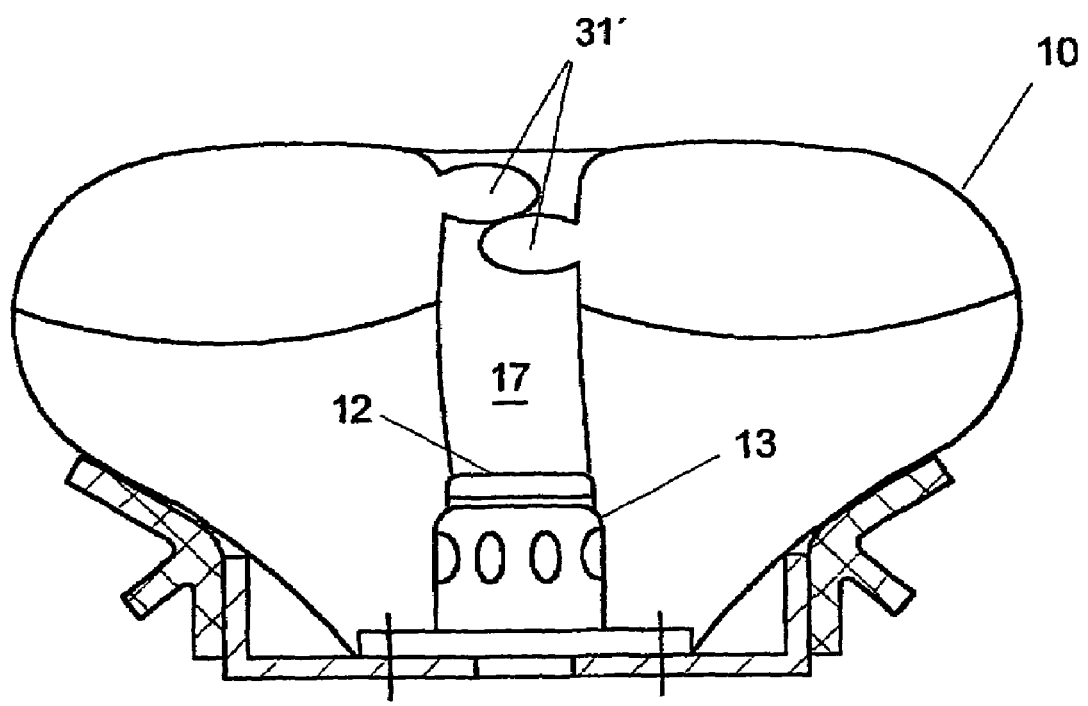
FIG. 10 shows diagrammatically a cross section of a variant of an airbag according to the third exemplary embodiment in the inflated state.

FIG. 10 shows diagrammatically a cross section of a variant of the airbag 10 according to the third exemplary embodiment. In this variant, the pockets 31 are arranged in the upper part of the tubular region 17.

Figure 11:
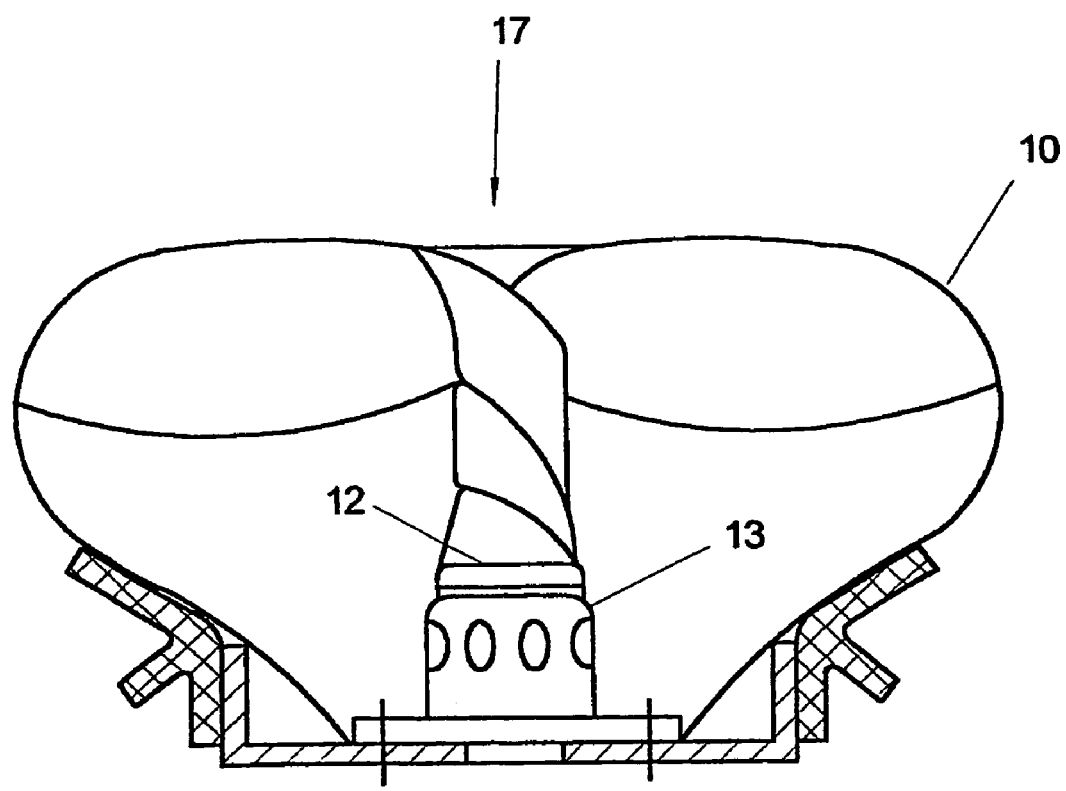
FIG. 11 shows diagrammatically a cross section of an airbag according to a fourth exemplary embodiment of the invention in the inflated state.

FIG. 11 shows diagrammatically a cross section of an airbag in the inflated state according to a fourth exemplary embodiment of the invention. In this exemplary embodiment, the upper plate is mounted on the airbag module so as to be rotated in relation to the tubular region 17 of the airbag 10. As a result, after the inflation of the airbag, the tubular region 17 is tied off, as shown, and is consequently closed.

Figure 12:
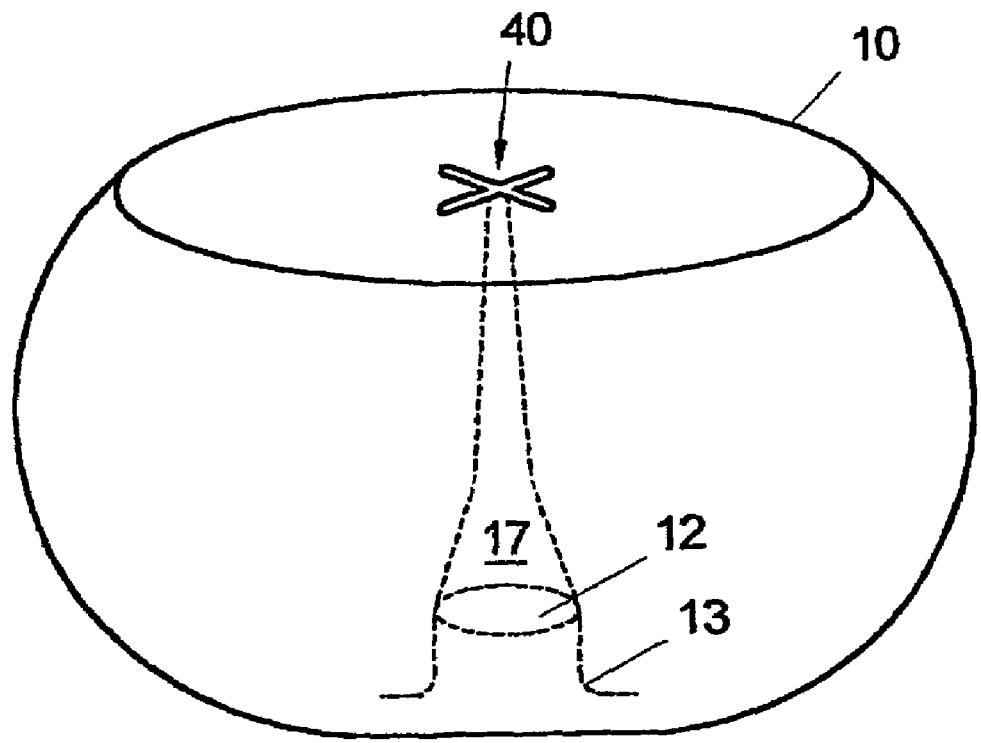
FIG. 12 shows diagrammatically a perspective view of an airbag according to a fifth exemplary embodiment of the invention in the inflated state.

FIG. 12 shows diagrammatically a perspective view of an airbag 10 according to a fifth exemplary embodiment of the invention, in the inflated state. In this exemplary embodiment, the tubular region 17 has a star-shaped cross section 40. Such a cross section, on the one hand, allows a deployment of the airbag around the emblem 12, but at the same time limits the cross-sectional area of the tubular region 17. This is achieved in that the circumference of the star-shaped cross-sectional area is larger than that of the emblem 12. As a result of this shaping, the cross-sectional area is small in relation to the cross-sectional circumference.

Figure 13:
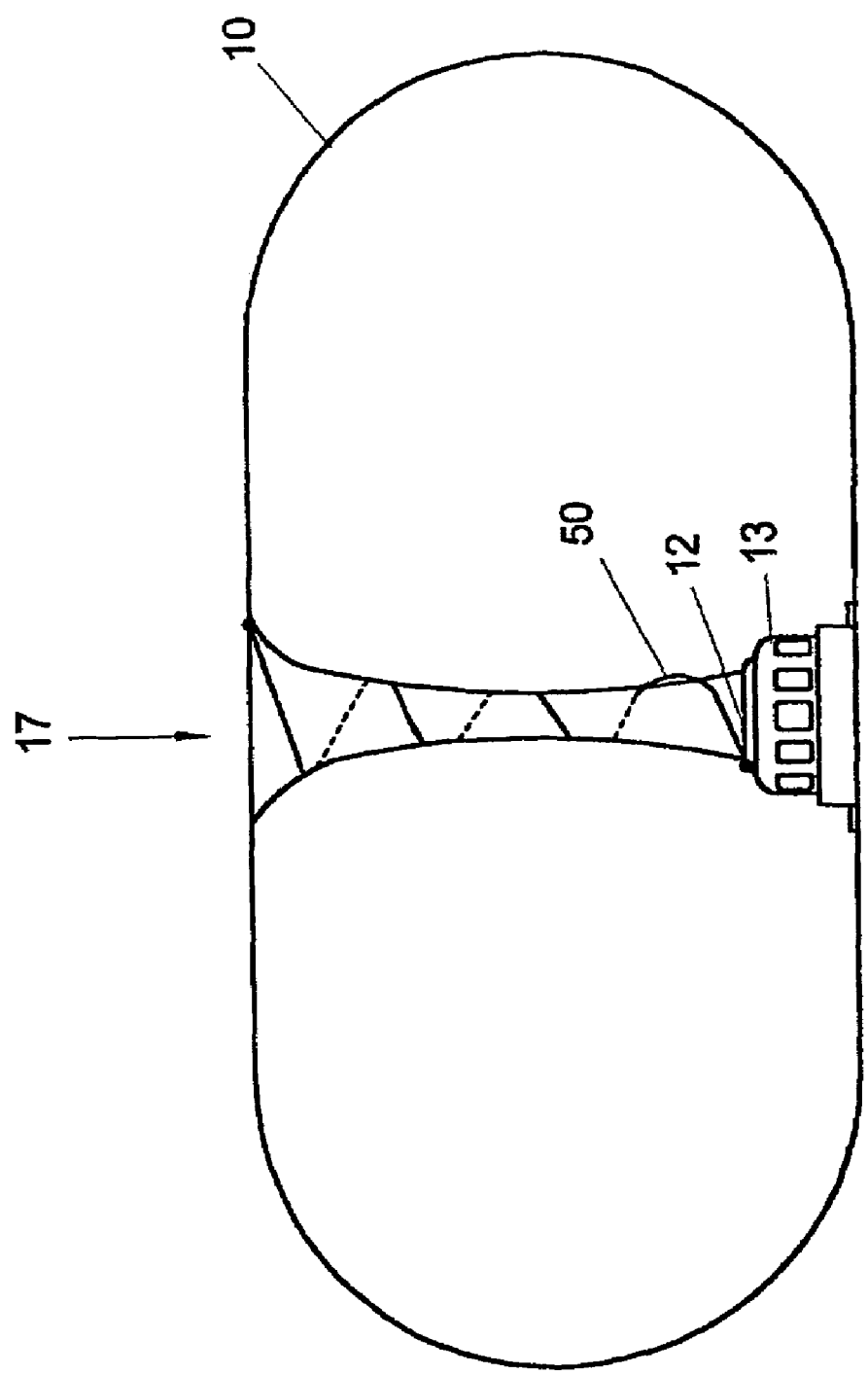
FIG. 13 shows diagrammatically a cross section of an airbag according to a sixth exemplary embodiment of the invention in the inflated state.

FIG. 13 shows diagrammatically a cross section of an airbag 10 according to a sixth exemplary embodiment of the invention. In this exemplary embodiment, a tension band 50 is provided, which ties off the cylindrical region 17 in the inflated state of the airbag 10. For this purpose, the tension band 50 is laid spirally around the tubular region and is fastened at one end to the airbag module and at the other end to the upper plate of the airbag 10. At the same time, the length of the tension band is such that, in the event of a full deployment of the airbag, a tie-off of the tubular region is triggered.

Figure 14:
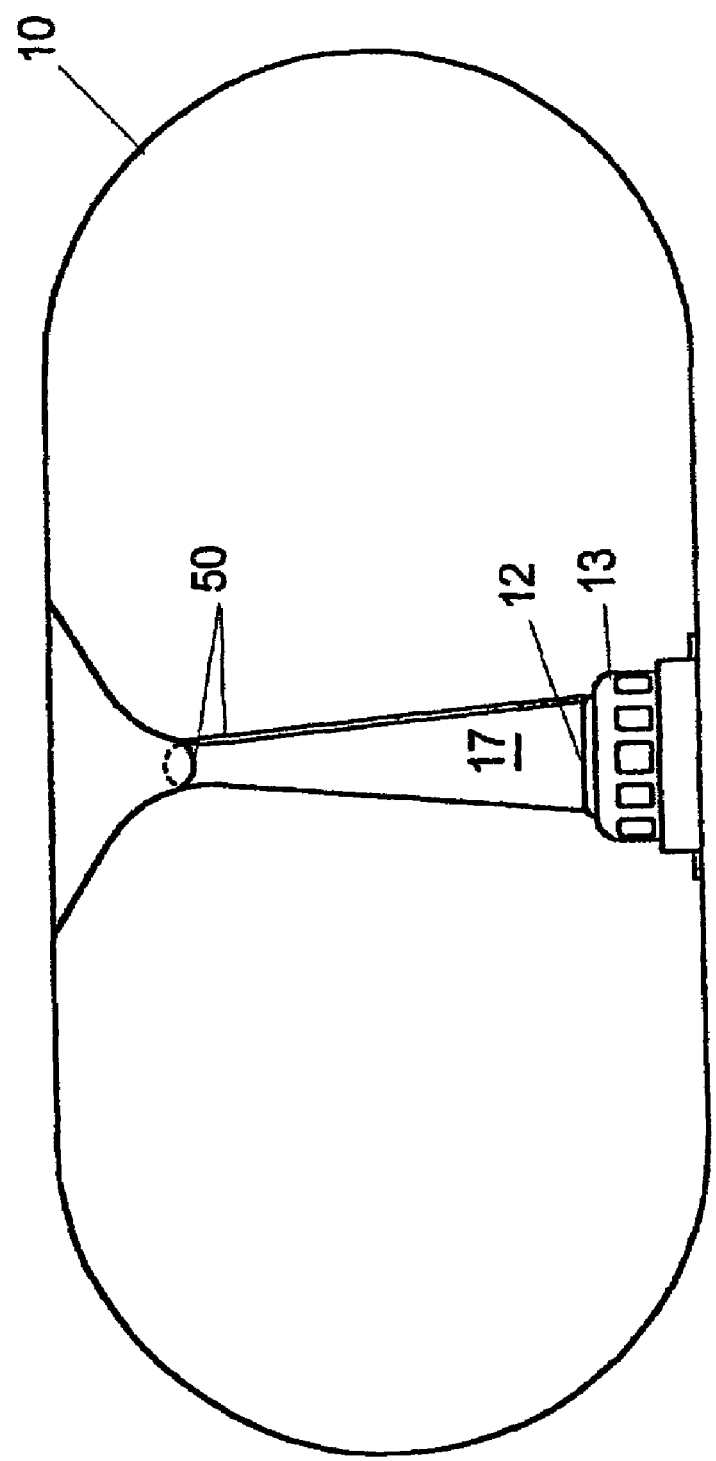
FIG. 14 shows a design variant of the sixth exemplary embodiment.

FIG. 14 shows a design variant of the sixth exemplary embodiment. In this variant, the tension band is not laid spirally around the tubular region 17 and fastened, but only simply around the upper circumference of the region 17. Once again, the length of the tension band is such that, in the event of a complete inflation of the airbag 10, the tubular region is tied off at the top.

Figure 15:
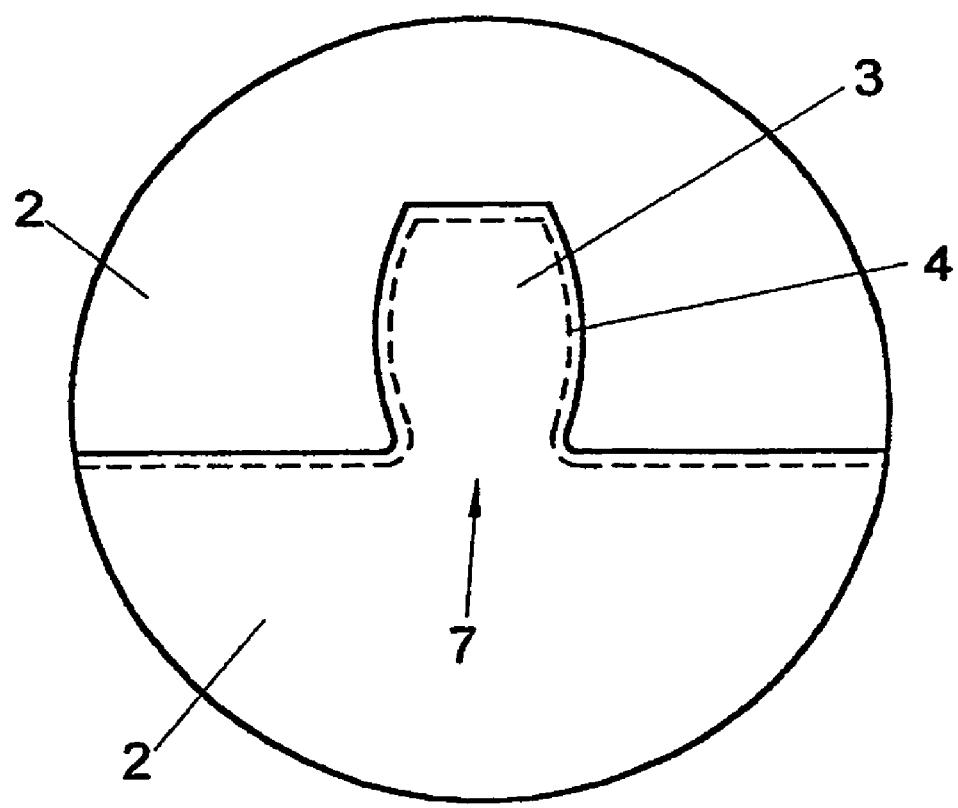
FIG. 15 shows the upper plate of an airbag according to the first exemplary embodiment in a partly folded state.
Figure 16:
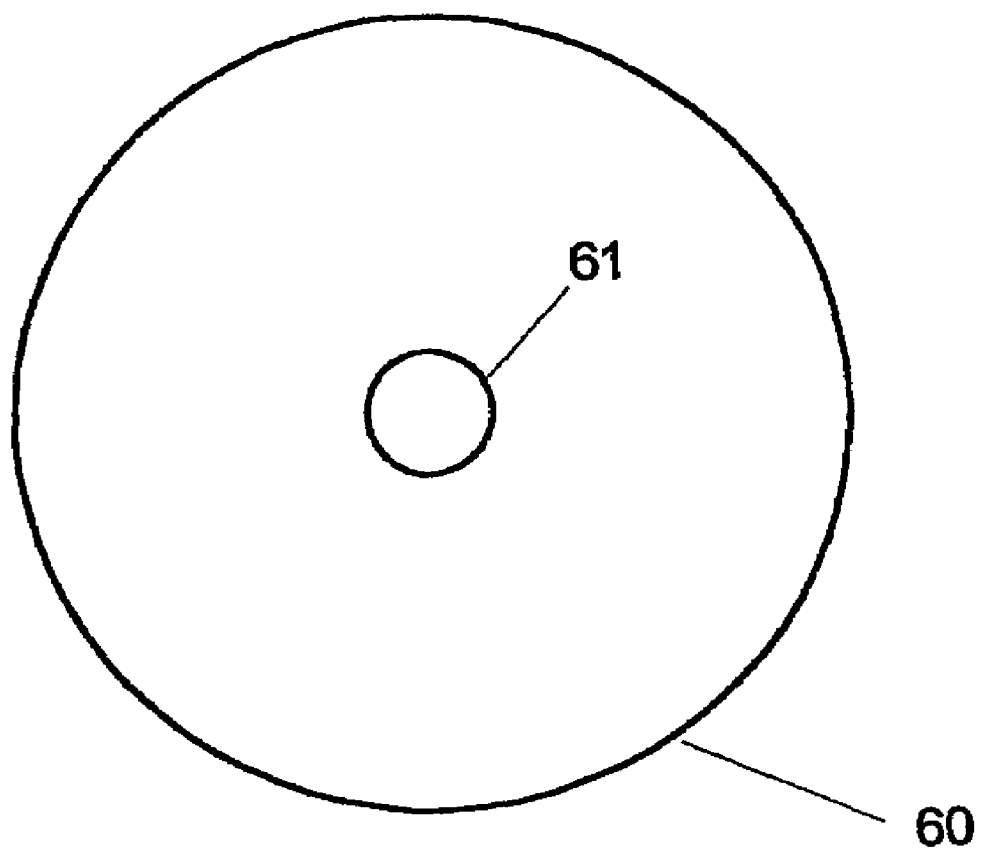
FIG. 16 shows the lower plate of an airbag according to the first exemplary embodiment.

For the sake of completeness, FIGS. 15 and 16 show diagrammatically a top view of the upper plate 5 and of a lower plate 60 of the airbag 10 according to the first exemplary embodiment. The upper plate 5 is shown in a partly folded state, with the tongues 3 stitched together. The reference symbols in this case correspond to those of FIG. 1. Moreover, the lower plate 60 has a hole 61 for fastening to the airbag module.

It is to be noted that the invention is not restricted to the exemplary embodiments described, but embraces modifications within the scope of protection defined by the claims.

The invention claimed is:

1. An airbag for a vehicle, to be arranged in a steering wheel of the vehicle under a cover, in such a way that, during a deployment of the airbag, a center part of the cover remains in position, with an upper plate and a lower plate connected to the latter, and with a tubular region, to be arranged above the center part, for connecting the upper plate to an airbag module in the region of the center part, and in an inflated state of the airbag the cross-sectional area of the tubular region decreasing from the center part in the direction of the upper plate, characterized in that the upper plate comprises two halves which are distinct members and essentially symmetrical to one another and each have a tongue, the tongues forming the tubular region.

2. The airbag as claimed in claim 1, wherein in a wall of the tubular region one or more inflatable pockets are provided, which, in the inflated state, reduce the cross-sectional area of the tubular region.

3. The airbag as claimed in claim 1, wherein in a wall of the tubular region one or more folds are provided, which, in the inflated state of the airbag, form pockets which reduce the cross-sectional area of the tubular region.

4. The airbag as claimed in claim 1, wherein the cross-sectional area of the tubular region on the upper plate is star-shaped.

5. The airbag as claimed in claim 1, wherein the tubular region is mounted on the airbag module so as to be rotated with respect to the upper plate.

6. The airbag as claimed in claim 1, wherein the tubular region comprises a fabric which, during the inflation of the airbag, contracts in one direction in such a way that the cross-sectional area of the tubular region is reduced.

7. An airbag for a vehicle, to be arranged in a steering wheel of the vehicle under a cover, in such a way that, during a deployment of the airbag, a center part of the cover remains in position, with an upper plate and a lower plate connected to the latter, and with a tubular region, to be arranged above the center part, for connecting the upper plate to an airbag module in the region of the center part, and in an inflated state of the airbag the cross-sectional area of the tubular region decreasing from the center part in the direction of the upper plate, characterized in that the upper plate comprises two halves which are essentially symmetrical to one another and each have a tongue, the tongues forming the tubular region, and a tension band which is fastened at one end to the airbag module and at the other end to the upper plate and which runs around the tubular region, for tying off the tubular region during the inflation of the airbag.

8. An airbag for a vehicle, to be arranged in a steering wheel of the vehicle under a cover, in such a way that, during a deployment of the airbag, a center part of the cover remains in position, with an upper plate and with a lower plate connected to the upper plate, characterized in that the upper plate comprises two halves which are distinct members and essentially symmetrical to one another and which each have a part essentially in the form of a circular cutout and a tongue running in the direction of the height of the circular cutout, the two halves being connected to one another along the chords of the circular cutouts, as well as in the region of the starts of the tongues, and also along the sides of the tongues, and the upper plate being capable of being fastened to an airbag module, below the center part, in the region of those ends of the tongues which point away from the circular cutouts.

9. The airbag as claimed in claim 8, wherein the halves are connected to one another at least partially by stitching.

10. An airbag for a vehicle, to be arranged in a steering wheel of the vehicle under a cover, in such a way that, during a deployment of the airbag, a center part of the cover remains in position, with an upper plate and with a lower plate connected to the upper plate, characterized in that the upper plate comprises two halves which are essentially symmetrical to one another and which each have a part essentially in the form of a circular cutout and a tongue running in the direction of the height of the circular cutout, the two halves being connected to one another along the chords of the circular cutouts, as well as in the region of the starts of the tongues, and also along the sides of the tongues, and the upper plate being capable of being fastened to an airbag module, below the center part, in the region of those ends of the tongues which point away from the circular cutouts, wherein the tongues each have a barrel-shape.

11. The airbag as claimed in claim 8, wherein the tongues each having at least one fold.

12. The airbag as claimed in claim 8, wherein the tongues each have at least one pocket.

13. The airbag as claimed in claim 8, wherein the tongues are attached to the airbag module so as to be rotated in relation to the parts having the form of a circular cutout.

14. The airbag as claimed in claim 8, wherein the tongues comprise a fabric which, in the event of expansion along the longitudinal axis of the tongues, contracts transversely thereto.

* * * * *